Patented Aug. 1, 1933

1,920,352

UNITED STATES PATENT OFFICE 1,920,352

THERMAL TYPE CARBON BLACK

Roy H. Brownlee, Pittsburgh, Pa.

No Drawing. Application March 14, 1932
Serial No. 598,880

7 Claims. (Cl. 134—60.)

This invention relates to a special thermal type carbon black.

In describing the carbon black of the invention reference will be made to standard channel carbon black, of which Cabot's certified carbon black may be taken as an example, and the thermal type carbon blacks produced by passage of gas through a highly heated checkerwork, and which have been designated collectively "thermatomic" carbon blacks. The "thermatomic" carbon black referred to herein is the carbon black disclosed in Patent No. 1,478,730, granted to Roy H. Brownlee and Roy H. Uhlinger December 25th, 1923, and the carbon black disclosed in Patent No. 1,794,558, granted to Ellwood B. Spear and Robert L. Moore March 3, 1931. In the former patent the Brownlee and Uhlinger carbon black is referred to as "Thermax", while the carbon black disclosed as an ingredient of a rubber composition in the latter patent is entitled "P—33".

The carbon black of the present invention is a special carbon black produced by the methods disclosed in my copending application Serial No. 446,849, filed April 24, 1930, on Method of producing carbon black, copending application Serial No. 583,370, filed December 26, 1931, on Carbon black producer, and copending application Serial No. 583,369, filed December 26, 1931, on Production of carbon black.

Briefly described, the primary features of the method defined in the above noted applications comprise the passage of a hydrocarbon gas to be decomposed through flame and adjacent a highly heated radiant surface. The gas to be decomposed is thus subjected to the heating effect of the flame, and to additional heat units supplied by the heated refractory material. As disclosed in the above noted copending applications, the temperature of the refractory is maintained in the disassociation range of the hydrocarbon by decomposition of which the carbon black formed. The atmosphere within the furnace is inert, so that the effect on the gas is one of true decomposition rather than a partial combustion or combustion in part. The process is therefore a "thermal" process as opposed to the partial combustion process by which channel black is obtained.

There is a tendency for a certain percentage of the carbon black as produced to deteriorate on heating continued after the instant of its formation. The method disclosed more particularly in application Serial No. 583,369, filed December 26, 1931, effects a rapid cooling of the carbon black after its formation, thus obtaining a maximum yield of carbon black possessing the characteristics of the carbon black herein disclosed. It may be initially stated that this carbon black is closer in its characteristics to standard channel black than either of the other thermal carbon blacks "Thermax" and "P—33" noted above.

My thermal carbon black differs from both "Thermax" and "P—33", defined in the above noted patents, in several marked particulars, differing more widely from the "Thermax" carbon than from the "P—33." The differences may be partially listed as follows:

1. It shows a remarkably lesser apparent weight per cubic foot, weighing (according to the conditions established for the process by which it is produced) from 3.75 pounds to 9 pounds per cubic foot. The "P—33" carbon black weighs from 12 to 20 pounds per cubic foot, and the "Thermax" carbon black weighs from 25 to 35 pounds per cubic foot.

2. It is more flocculent than "P—33" carbon black, and much more flocculent than "Thermax" carbon black.

3. The average particle size is finer than "P—33" or "Thermax" carbon black.

4. Its oil absorption is greater than that of "P—33" or "Thermax."

5. When incorporated in rubber it accelerates the cure of the rubber to a much more marked degree than "P—33" or "Thermax," the positive acceleration attributable to the use of the "thermatomic" blacks being relatively slight.

6. Its tinting strength is far greater than that of either "P—33" or "Thermax."

It should be noted in connection with the distinction as to the weight of the carbon black, that the true specific gravity of my thermal carbon black, the other two noted thermal, or "thermatomic," carbon blacks, and standard channel black are all substantially equal. These specific gravities vary in the various carbon blacks from 1.75 to 1.9, and my carbon black has a true specific gravity of substantially 1.8, which may be taken as the approximate standard specific gravity for channel black.

As to the likenesses and differences of my thermal carbon black with respect to standard channel black the following may be noted:

(a) The apparent weight of my thermal carbon black, being from 3.5 to 9 pounds per cubic foot is materially less than the apparent weight of standard channel black, since the latter has an apparent weight of from 12 pounds upward per cubic foot. The apparent weight of my carbon black therefore varies from 75% downward as compared with standard channel black. As above noted the true specific gravity of my thermal black is approximately equal to the true specific gravity of standard channel black.

(b) My carbon black has a greater flocculence than standard channel black.

(c) The average particle size of my thermal carbon black is finer than that of standard channel black, and from its behavior under certain conditions it is apparent that an equal volume of my carbon black presents a much greater particle surface area, than standard channel black.

(d) My thermal carbon black has an oil absorption substantially equal to that of standard channel black.

(e) When incorporated in rubber under like conditions, its effect with respect to tear and abrasion tests of the rubber is substantially equivalent to the effect of standard channel black. Further its effect in hardening the rubber is substantially equivalent to that of standard channel black.

(f) When incorporated in rubber but one half or less the amount of accelerator is required as compared with the accelerator required when standard channel black is used, in order to cure the rubber within equal periods of time. It has a marked accelerating effect in the cure of rubber, whereas standard channel black appears to have a slight retarding effect.

(g) The tinting strength of my thermal carbon black is greater than the tinting strength of standard channel black.

The comparisons as to apparent weight, or bulking weight, and specific gravity are readily obtained by tests commonly in use for various materials. The comparison as to flocculence and particle size with its attendant comparison as to total particle area per unit volume is observed microscopically, while the comparison as to acceleration of the cure of rubber has been determined in making up rubber batches in accordance with standard commercial practice. Similarly the rubber so made has been submitted to the usual commercial tests for hardness, abrasion and tear, such for example as the Goodrich peanut-tear test and the Hood tongue-tear test.

I have compared the tinting strength of my thermal carbon black by making up test slides, with varying ratios of "Thermax," "P—33," Cabot's certified channel black, and my special carbon black, in mixing these various carbon blacks in various proportions with zinc oxide. In so doing test slides were made up from pastes containing the carbon blacks and zinc oxide in specified proportions by weight, together with a small quantity of oil having in itself no substantial tinting value. Using two and one-half parts by weight of Cabot's certified channel black, my special channel black, and thermatomic channel black with one hundred parts of zinc oxide, the greater tinting value of my carbon black as compared with the Cabot's certified channel black is strikingly apparent to the eye. I also made tinting samples of the various carbon blacks, each of which samples comprises five parts by weight of carbon black to a hundred parts by weight of zinc oxide. In these latter samples the comparative darkness of my carbon black to that of the Cabot's certified channel black is equally striking. Utilizing ten parts by weight of each of the carbon blacks to a hundred parts by weight of the zinc oxide, the test sample of standard channel black still exhibits a marked grayish cast, while the paste made up with my special carbon black is apparently jet black, without any grayish undertone.

Without the performance of scientific tests of tinting strengths, it is obvious that the tinting strength of my special carbon black is not only much greater than that of the thermatomic carbon blacks, but is well beyond that of the standard channel blacks.

My thermal carbon black has, therefore, a particularly high value for use as a pigment black, both because of its tinting strength, and because of the facility and uniformity with which it becomes distributed through the carrying medium, or mediums, constituting the body, or base, of a paint or varnish.

As explained above, my special carbon black belongs in classification among "thermal" carbon blacks, and not among the "channel" blacks. This is for the reason that the two typical methods of production, decomposition and partial combustion, comprise on the one hand the "thermatomic" carbon blacks "Thermax" and "P—33" and on the other hand the standard channel blacks exemplified by Cabot's certified channel black. My carbon black, being produced wholly by decomposition, as opposed to partial combustion is a thermal black rather than a channel black.

A marked economic distinction between the thermal black and channel blacks is in the comparative yield of each obtained from a given quantity of hydrocarbon gas. Thus while the yield from "natural" gas by the thermal methods varies from three pounds to ten pounds from each thousand cubic feet of gas, the yield from the same gas by the channel methods is two pounds, or less, per thousand cubic feet. The thermal blacks are therefore less expensive to produce than the standard channel blacks, and have an economic advantage in that they conserve natural gas used for their production.

It is remarkable that my carbon black, belonging to the thermal type, and having the economic advantages of its type, none the less approaches in its qualities the standard channel blacks more nearly than the thermal black. In fact it exceeds standard channel black in those very qualities which are typical of channel black, in that it has a greater flocculence, a lesser apparent weight per unit volume, and a greater tinting strength. Its effect when incorporated in rubber is substantially equivalent to the effect of standard channel black save as pertains to the curing of the rubber. In the latter regard, it exerts a marked accelerating effect as compared to the slight retardation caused by channel black.

I claim as my invention:

1. As a new material of manufacture a thermal type carbon black resulting from the thermal disassociation of a hydrocarbon in passage through flame and past a refractory surface heated to at least the disassociation temperature of the hydrocarbon, said carbon black characterized by a flocculence at least as marked as that of standard channel black.

2. As a new material of manufacture a thermal type carbon black resulting from the thermal disassociation of a hydrocarbon in passage through flame and past a refractory surface heated to at least the disassociation temperature of the hydrocarbon, said carbon black characterized by apparent weight per unit volume materially less than that of standard channel black with a true specific gravity substantially equal thereto.

3. As a new material of manufacture a thermal type carbon black resulting from the thermal disassociation of a hydrocarbon in passage through flame and past a refractory surface heated to at least the disassociation temperature of the hydrocarbon, said carbon black characterized by an apparent weight per unit volume no greater than seventy-five per cent the weight of standard channel black with a true specific gravity substantially equal thereto.

4. As a new material of manufacture a thermal type carbon black resulting from the thermal disassociation of a hydrocarbon in passage through flame and past a refractory surface heated to at least the disassociation temperature of the hydrocarbon, said carbon black characterized by a tinting strength greater than the tinting strength of standard channel black.

5. As a new material of manufacture a thermal type carbon black resulting from the thermal disassociation of a hydrocarbon in passage through flame and past a refractory surface heated to at least the disassociation temperature of the hydrocarbon, said carbon black characterized by a flocculence at least as marked as that of standard channel black and by a tinting strength greater than that of standard channel black.

6. As a new material of manufacture a thermal type carbon black resulting from the thermal disassociation of a hydrocarbon in passage through flame and past a refractory surface heated to at least the disassociation temperature of the hydrocarbon, said carbon black characterized by a tinting strength at least equal to the tinting strength of standard channel black.

7. As a new material of manufacture a thermal type carbon black resulting from the thermal disassociation of a hydrocarbon in passage through flame and past a refractory surface heated to at least the disassociation temperature of the hydrocarbon, said carbon black characterized by an apparent weight when uncompressed of from three and three-fourths pounds to nine pounds per cubic foot.

ROY H. BROWNLEE.